(12) United States Patent
Anderson (10) Patent No.: US 7,309,202 B1
(45) Date of Patent: Dec. 18, 2007

(54) COMBINATION LOADING RAMP/EXTENSION TABLE FOR A TRUCK BED

(76) Inventor: Michael D. Anderson, 7453 Sunset Dr., Hazelwood, MO (US) 63042

( * ) Notice: Subject to any disclaimer, the term of this patent is extended or adjusted under 35 U.S.C. 154(b) by 199 days.

(21) Appl. No.: 11/001,383

(22) Filed: Dec. 1, 2004

(51) Int. Cl.
*B60R 5/04* (2006.01)

(52) U.S. Cl. .................. 414/537; 414/462; 414/465; 224/403; 224/42.32; 224/554; 224/564; 224/281; 108/44

(58) Field of Classification Search .............. 414/537, 414/462, 465, 743; 224/403, 42.32, 554; 224/564, 281; 108/44
See application file for complete search history.

(56) References Cited

U.S. PATENT DOCUMENTS

| 1,477,812 | A | * | 12/1923 | Crockett ............... 297/158.5 |
| 2,545,269 | A | * | 3/1951 | Ford ................... 312/334.13 |
| 3,394,666 | A | * | 7/1968 | Pearlman ................. 108/129 |
| 4,375,306 | A | * | 3/1983 | Linder .................. 312/249.9 |
| 5,090,335 | A | * | 2/1992 | Russell .................... 108/44 |
| 5,634,408 | A | * | 6/1997 | Jarkowski ................. 108/44 |
| 5,829,947 | A | * | 11/1998 | Litten ..................... 414/537 |
| 6,314,891 | B1 | * | 11/2001 | Larson .................... 108/44 |
| D466,469 | S | * | 12/2002 | Nelson, Jr. ............. D12/221 |
| 6,524,055 | B1 | * | 2/2003 | Overbye .................. 414/537 |
| 6,527,326 | B2 | * | 3/2003 | Henderson ................. 296/61 |
| 6,564,621 | B1 | * | 5/2003 | Keaton .................... 73/116 |
| 6,709,038 | B2 | * | 3/2004 | Bienert et al. ........... 296/26.1 |
| 6,739,269 | B1 | * | 5/2004 | Benton .................... 108/44 |
| 6,834,903 | B2 | * | 12/2004 | Harper et al. ............. 296/51 |
| 6,883,849 | B2 | * | 4/2005 | Hebert .................. 296/26.09 |
| 6,929,302 | B1 | * | 8/2005 | Demick et al. ......... 296/26.01 |
| 6,991,277 | B1 | * | 1/2006 | Esler ...................... 296/50 |
| 2001/0033085 | A1 | * | 10/2001 | Bienert et al. ......... 296/26.01 |
| 2004/0160079 | A1 | * | 8/2004 | Harper et al. .............. 296/61 |
| 2005/0241546 | A1 | * | 11/2005 | Royse .................... 108/44 |

* cited by examiner

*Primary Examiner*—Saul Rodriguez
*Assistant Examiner*—Gina M. Lupino
(74) *Attorney, Agent, or Firm*—C. John Brannon; Sommer Barnard PC (57) ABSTRACT

A system for transporting and storing a portable combination table/ramp device in a truck bed, including a substantially flat platform supported by a plurality of support members positioned between the platform and the truck bed and defining a plurality of elongated recesses therebetween. Elongated table top portion and elongated bench seat portions with tailgate-engaging portions connected thereto are received in the recesses. A plurality of retractable table leg assemblies are connected to the table top portion. A connector is coupled to each respective table leg assembly for connecting the elongated bench seat portion thereto. Each respective table leg assembly is retractable to a storage position substantially adjacent the elongated table top portion and extendable to a deployed position extending between the table top portion and the ground.

9 Claims, 13 Drawing Sheets

COMBINATION LOADING RAMP/EXTENSION TABLE FOR A TRUCK BED

TECHNICAL FIELD OF THE INVENTION

The present invention relates generally to the field of vehicular transportation, and, more particularly, to a combination loading ramp/extension table/free-standing picnic table concealable under a recessed false truck bed.

BACKGROUND OF THE INVENTION

Owning an all-terrain vehicle (ATV) occasionally requires one to transport the ATV from time to time. Typically, such transportation is accomplished by loading the ATV into a truck bed and trucking the ATV to the desired location for off-road adventures. Loading and unloading the ATV into the truck is typically accomplished through the employment of one or more ramps extending from the truck bed to the ground, over which the ATV is wheeled into/out of the truck. Known loading ramps tend to be bulky and take up valuable garage and/or truck space when not in use. This problem is especially acute for most ATV owners, since the need for the ramps is occasional at best. Thus, there exists a need for a truck loading ramp system that may be efficiently stored when not in use. The present invention addresses this need.

SUMMARY OF THE INVENTION

The present invention relates to a combination truck bed loading ramp/extension table system that may be stored under a false truck bed. One object of the present invention is to provide an improved loading ramp system. Related objects and advantages of the present invention will be apparent from the following description.

DESCRIPTION OF THE PREFERRED EMBODIMENTS

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

Referring now to FIGS. 1-6B, a first embodiment combination loading ramp/table system 10 is illustrated. The system 10 includes false truck bed portion 11 further including a number of support members 12 for positioning on a truck bed 14. The support members 12 are typically elongated members, such as I-beams, and are typically oriented parallel with the major axis of the truck bed 14. The false truck bed portion also includes a substantially flat member (i.e., a false truck bed portion) 16 positioned atop the support members 12 and is thus suspended parallel with and above the truck bed 14. The substantially flat member 16 may be connected to the truck bed 14 by one or more fasteners 15, such as bolts, pins, clips, adhesives, or the like. Typically, an intermediate flat member 17 is positioned between the flat member 16 and the support members 12. More typically, a watertight, typically pliable seal member 19 is affixed between the flat members 16, 17. With the flat member 16 in place above the truck bed 14, the support members 12 further define a number of elongated recesses 18 between the flat member 16 and the truck bed 14. Typically, one of the recesses 18 is wider and more centrally located (i.e., the central recess 20) than the other recesses 18. More typically, the central recess 20 is flanked on either side by elongated side recesses 22. The central and side recesses 20, 22 typically extend the length of the truck bed 14 and flat portion 16 (usually about 6 feet). Further, auxiliary recesses 24 may be defined that do not extend the length of the truck bed 14, such as those extending along the sidewall 26 of the truck bed 14 and are that are stopped by the wheel well 28. These recesses 20, 22, 24 are all accessible from the tailgate end 30 of the truck bed 14 when the tailgate 32 is extended in the open position. Also, a seal (typically pliable) member 19A is typically positioned atop the outer edge of the flat member 16, such that the seal member 19A engages the sidewalls 26 to form a substantially watertight seal.

Additional 'cabinet style' recesses 34 may be defined between the truck bed 14 and the flat portion 16 that are accessible via hinged or otherwise openable access panels 36 formed in the flat portion 16. These recesses 34 may be positioned behind the wheel wells 28, for example, and are thus not accessible from the tailgate end 30 of the truck bed 14. Alternately, recess 34 may be distanced sufficiently far from the tailgate end 30 such that access is impractical from the tailgate end 30, thus making the access panels 36 a more attractive option. Typically, access panels 36 include a watertight seal member affixed thereto. Drawers 38 may thus be inserted into recesses 24 for additional storage.

Central elongated member 40 is sized to fit in the central recess 20. The central elongated member 40 is typically about two feet wide and about six feet long, with the central recess 20 sized to accommodate sliding insertion of the central elongated member thereinto. Likewise, an elongated side member 42 (and more typically, two such members 42) is/are sized to fit in the elongated side recess(es) 22. The elongated side members 42 are typically about eight inches wide and about six feet long. Typically, the elongated recess 20, 22 are dimensioned to be slightly wider and longer that the corresponding elongated members 40, 42. Further typically, the elongated members 40, 42 are constructed of a structural material, such as steel, aluminum, polymer, composite materials, or the like, and are sufficiently thick so as to have sufficient strength to support an all terrain vehicle, a motorcycle, a lawnmower, or the like. For aluminum elongated members 40, 42, a typical wall thickness is about one-eighth of an inch.

Typically, the elongated members 40, 42 terminate at one end in a tailgate-engaging portion 44, such as a shallow hook or angled member. Further, a flexible member of variable length 45, such as a ratchetable rope, cord or chain, may be provided for connection between the elongated members 40, 42 (typically near the tailgate engaging portions 44) and a rear portion of the truck (such as the bumper or tailgate) for securing the elongated members 40, 42 to the truck.

The central elongated member 40 also typically includes legs or leg assemblies 50 connected thereto and extendable therefrom. Typically, each leg assembly 50 includes a pair of parallel leg members 52 connected by a cross member 54 that is positioned near the end of and pivotably or retractably attached to the central elongated member 40. The leg members 52 are typically of variable length. Further, each leg assembly 50 typically includes a side support member 56 hingedly, pivotably or otherwise retractably connected to each leg member 52. Typically, the side support member 56 is an L-shaped member, but may alternately have any other convenient shape. More typically, the side support member 56 is hinged, such that the side support member 56 takes on it L-shape (or the like) when deployed but may be straightened for movement into a storage position substantially adjacent the central elongated member 40. Alternately, a plurality of leg members 52 may be directly extendably connected to the elongated member 40; typically, some or all of the leg members 52 include side support members 56 extending therefrom for engagedly supporting side elongated members 42.

Each leg assembly 50 may thus be deployed by movement (such as pivoting or extending) away from the elongated member 40 and may then be locked into position so as to extend between the elongated member 40 and the ground. The L-shaped side support member 56 is likewise pivoted or extended away from the leg member 52 to provide support structure for the side elongated members 42. Upon deployment of opposing leg assemblies 50, a pair of side support members are positioned on either side of the elongated member 40 such that the side support members 56 may support an elongated side member 42 positioned to rest thereatop. More typically, the side support member 42 is fastened to the side support members 56 so as to provide a stable bench seat.

Figure 6A:
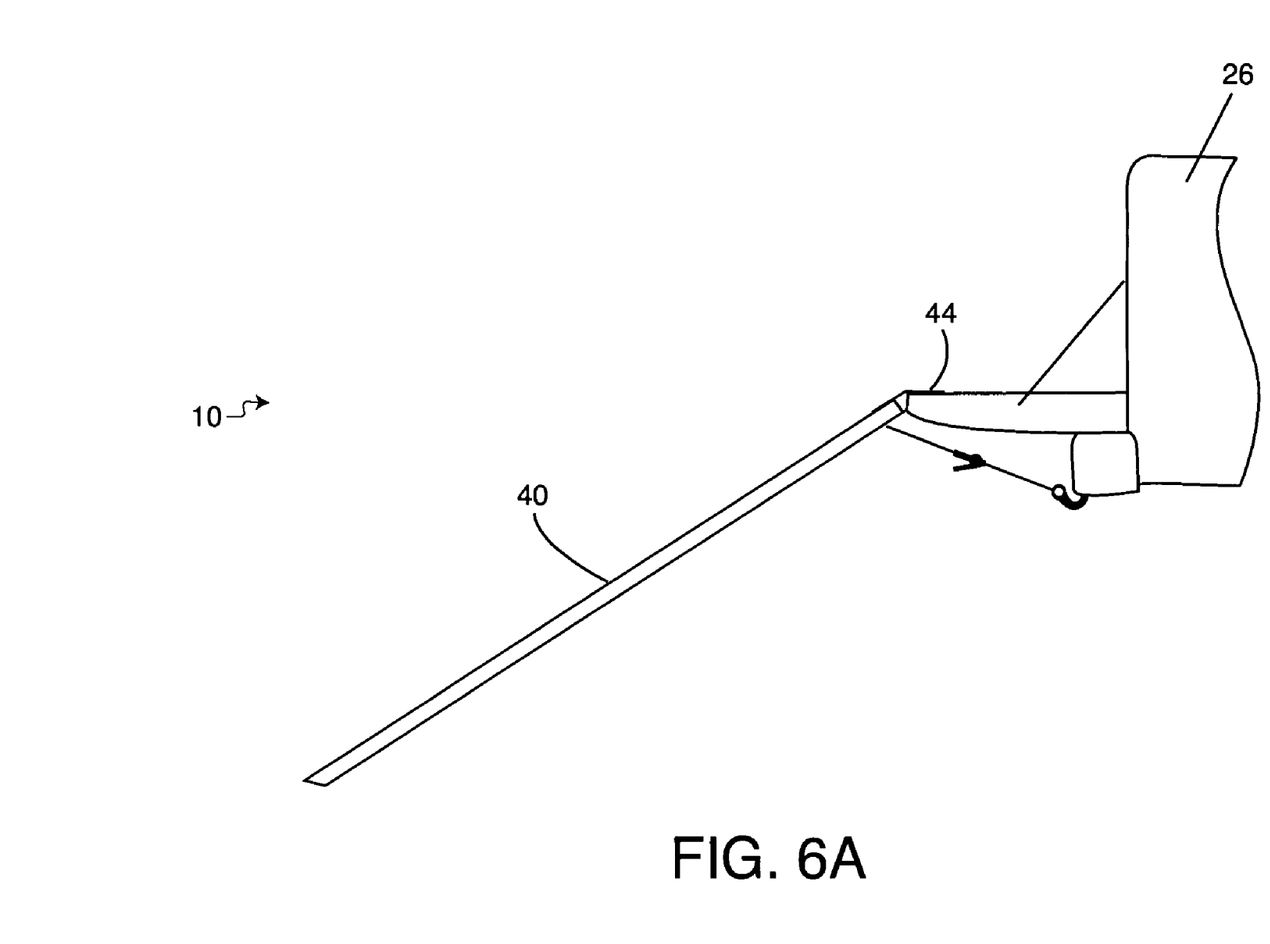
FIG. 6A is a side elevation view of FIG. 3.
Figure 6B:
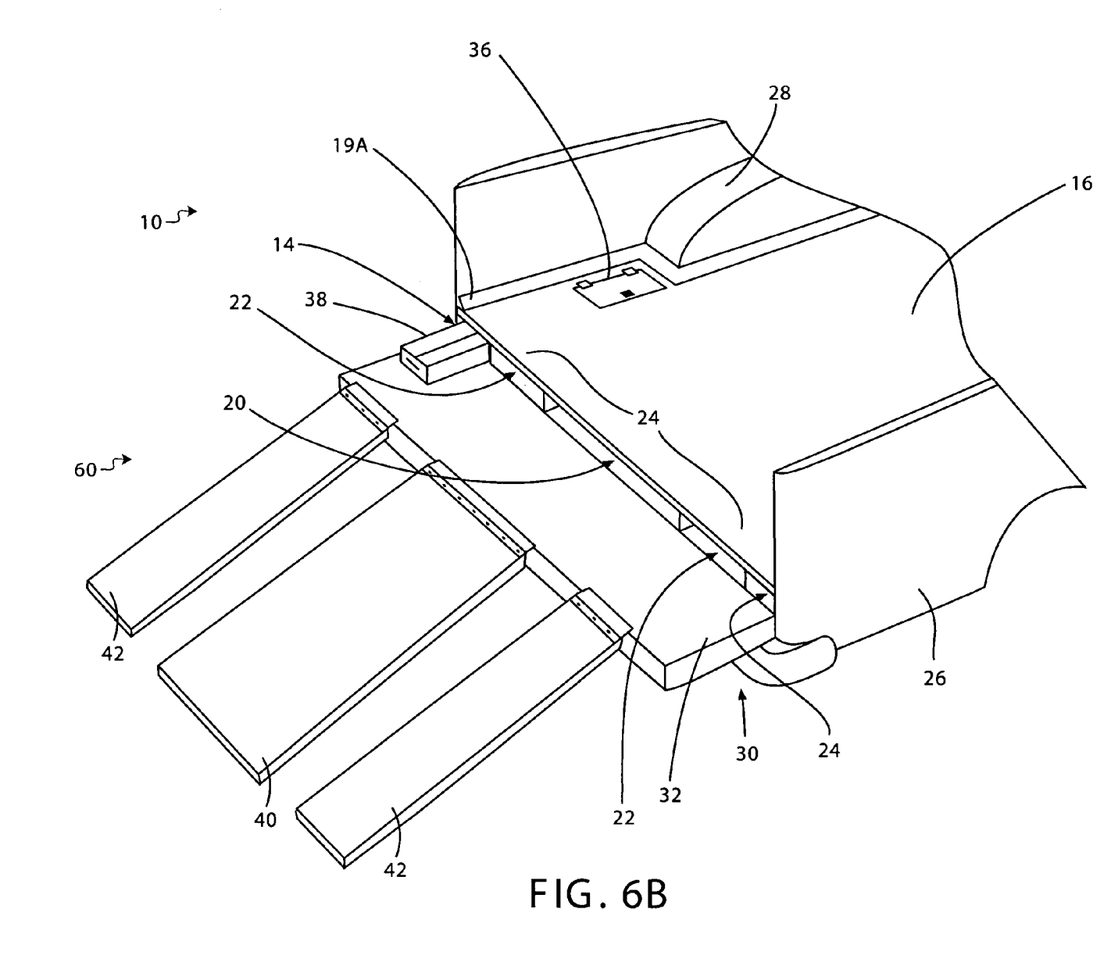
FIG. 6B is a partial perspective view of FIG. 1 with the ramp system deployed.

In operation, the elongated members 40, 42 are stored in the respective recesses 20, 22 until such time as they are needed. To form a loading ramp assembly 60 (as shown in FIG. 6B) extending between the truck bed 14 and the ground, the elongated central and side members 40, 42 are removed from the respective recesses 20, 22. The elongated members 40, 42 are respectively positioned with the tailgate engaging portions 44 resting on the tailgate 32 (or truck bed 14). More typically, the elongated members 40, 42 are positioned with the central elongated member 40 positioned between two side elongated members 42, although other configurations are of course possible and may be selected as desired. A flexible member 45 is typically connected between each elongated member 40, 42 and the truck and tensioned (such as by decreasing the length of the flexible member 45) to fixedly couple the elongated members 40, 42 to the truck.

Figure 1:
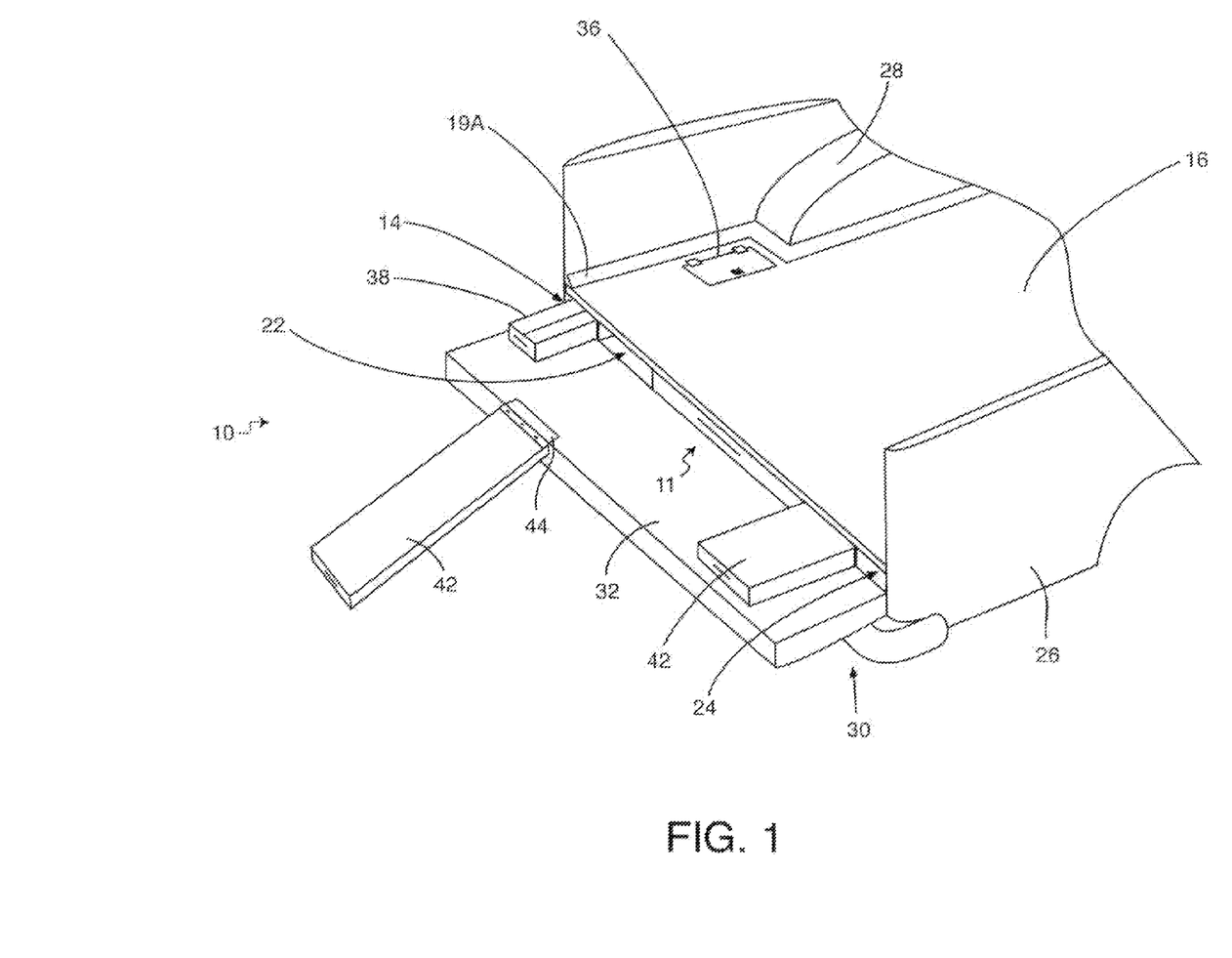
FIG. 1 is a partial perspective view of a first embodiment combination ramp/table assembly receivable within the recesses of a false truck bed of the present invention with a side ramp deployed.
Figure 2:
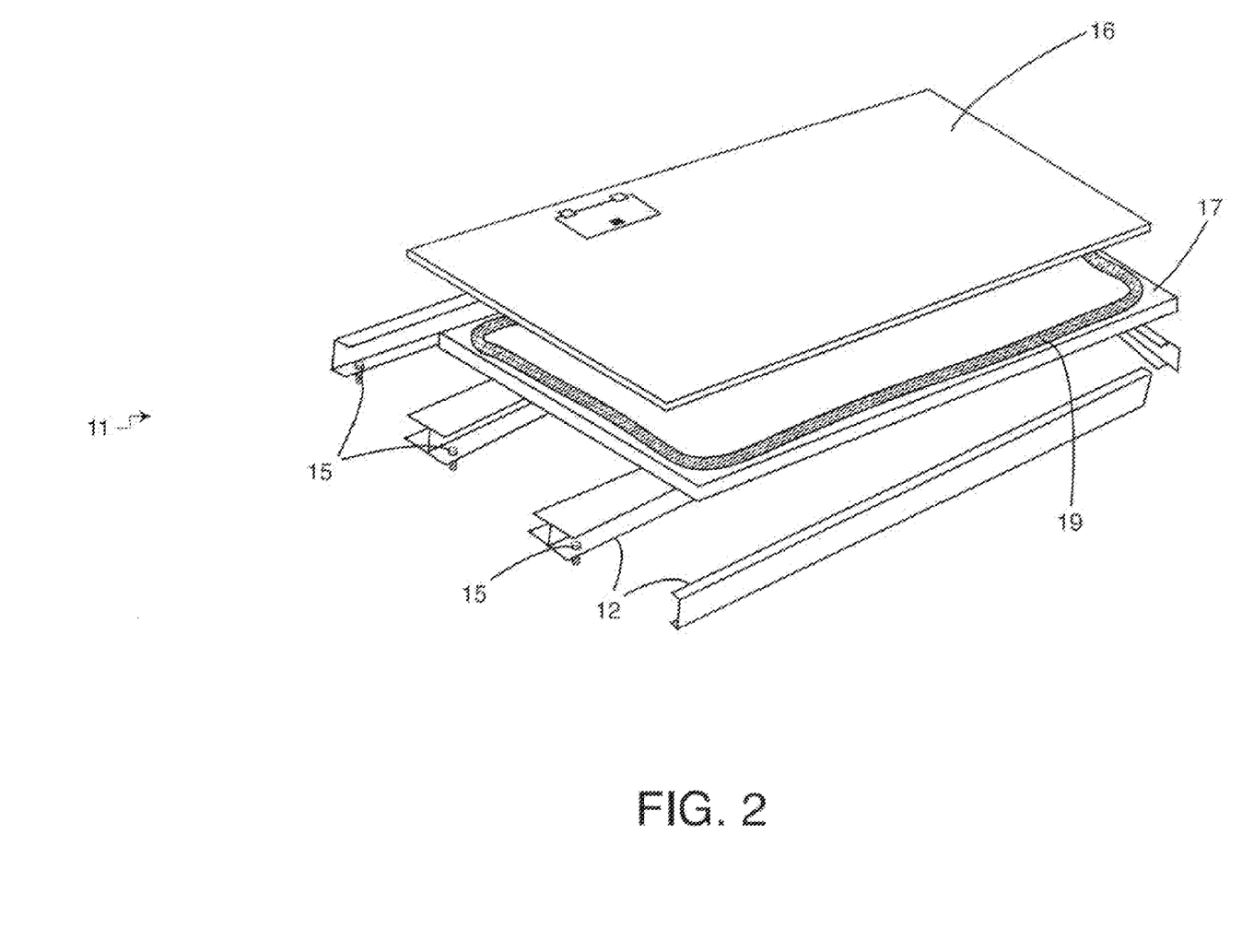
FIG. 2 is a partial exploded view of the assembly of FIG. 1.
Figure 3:
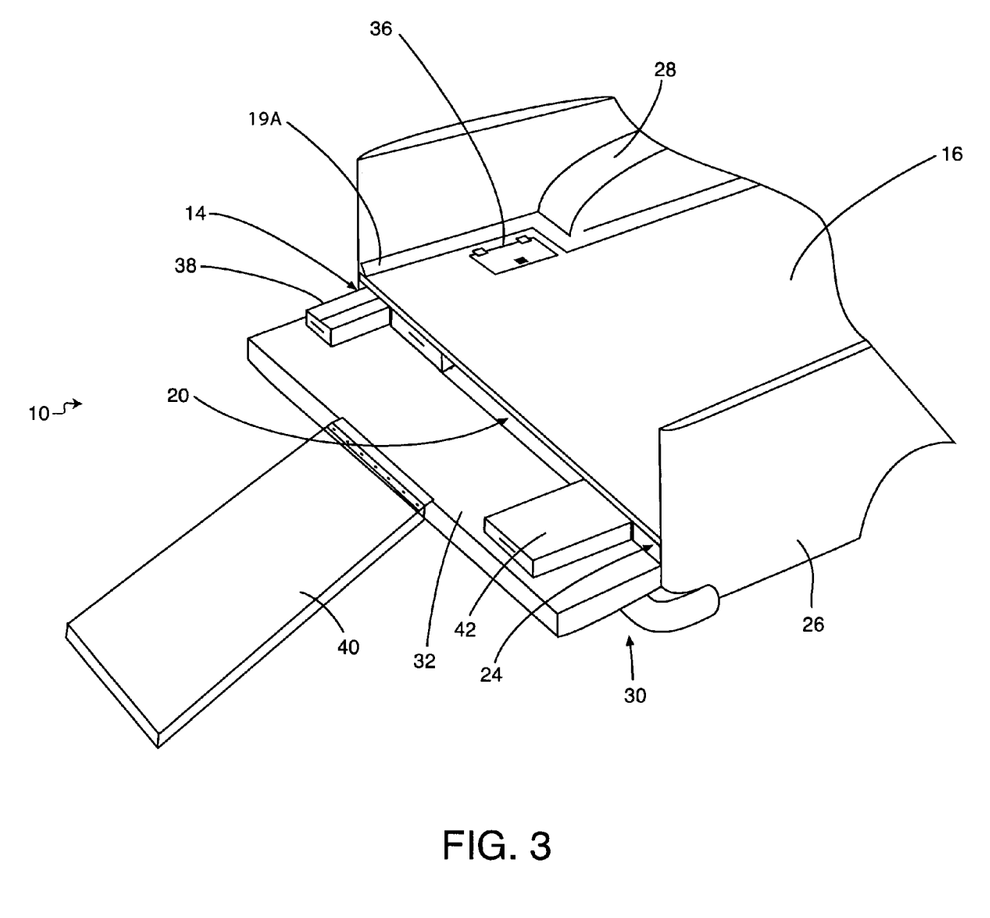
FIG. 3 is a partial perspective view of the assembly of FIG. 1 with the central elongated member removed from its recess and deployed as a ramp.
Figure 4:
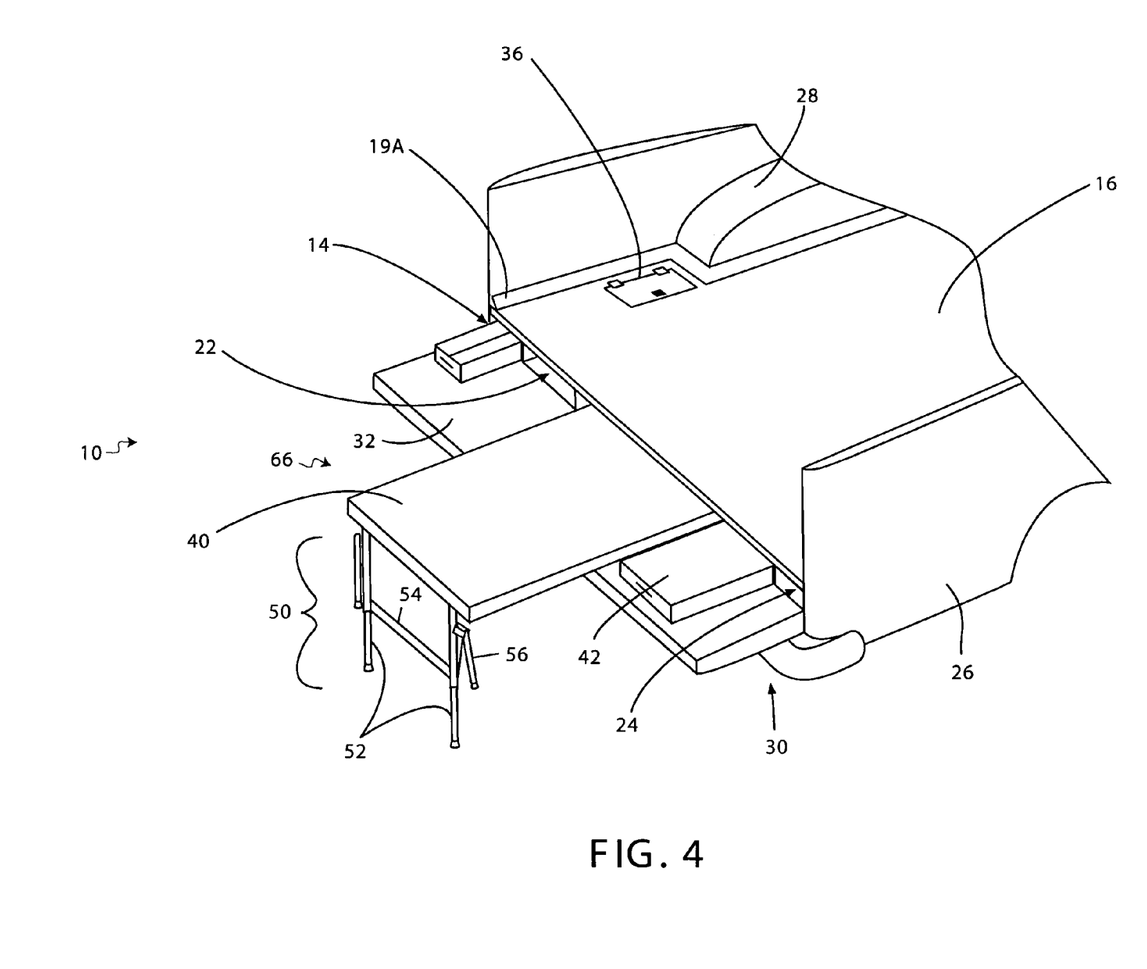
FIG. 4 is a partial perspective view of the assembly of FIG. 1 with the central elongated member partially removed from its recess and deployed as a work table.

To form a worktable 66 (as illustrated in FIG. 4), the central elongated member 40 may be partially removed from its recess 20, such as by partially sliding the elongated member 40 free of the recess 20. With a portion of the elongated member 40 still within the recess 20, the leg assembly 50 (or individual legs 52) connected to the opposite end is/are moved into the deployed position, i.e., are extended toward the ground. The elongated member 40 is thus supported at one end by the recess 20 and at the other end by the legs 52.

Figure 5A:
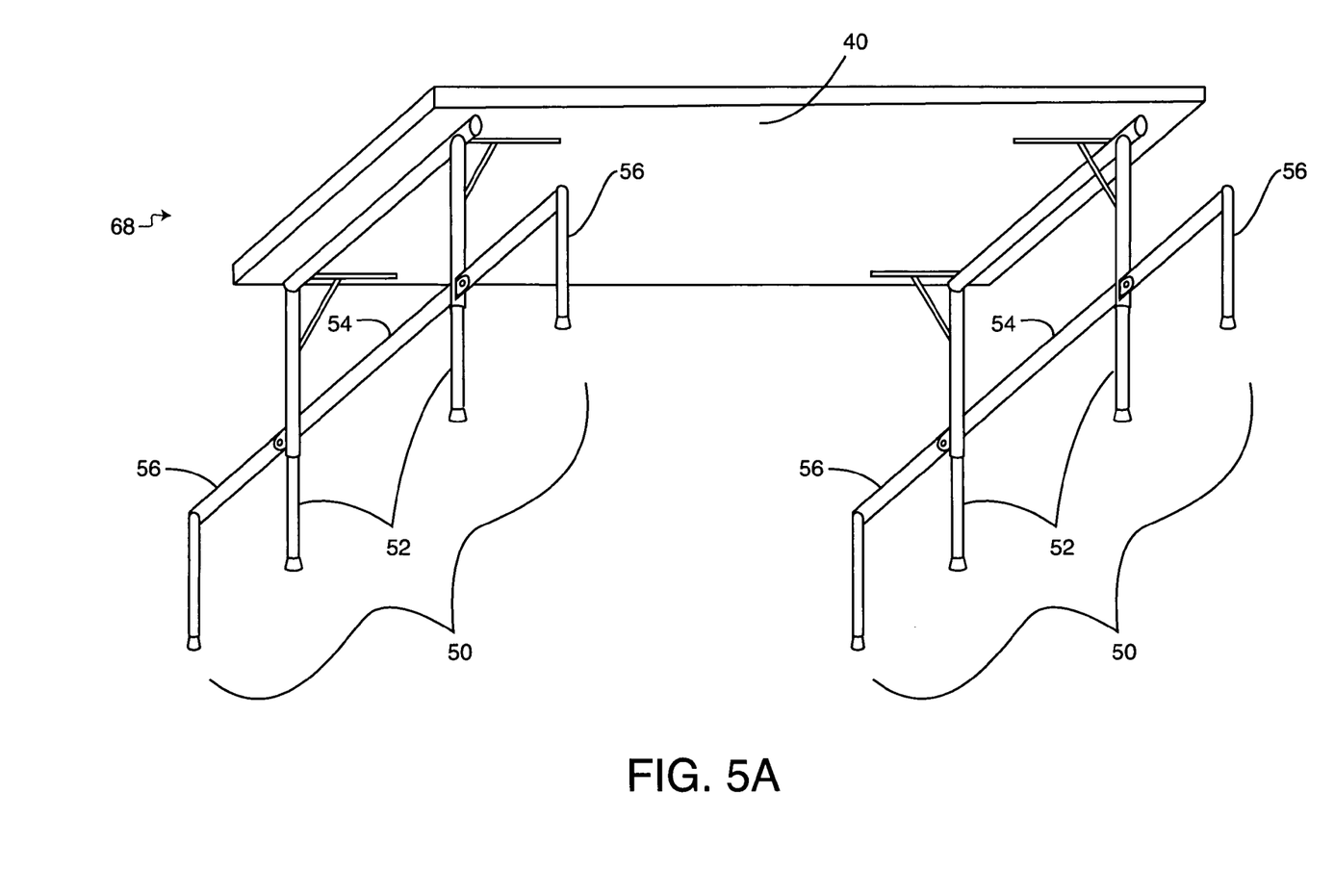
FIG. 5A is a first bottom perspective view of the central elongated member as removed from its recess and deployed as a table.
Figure 5B:
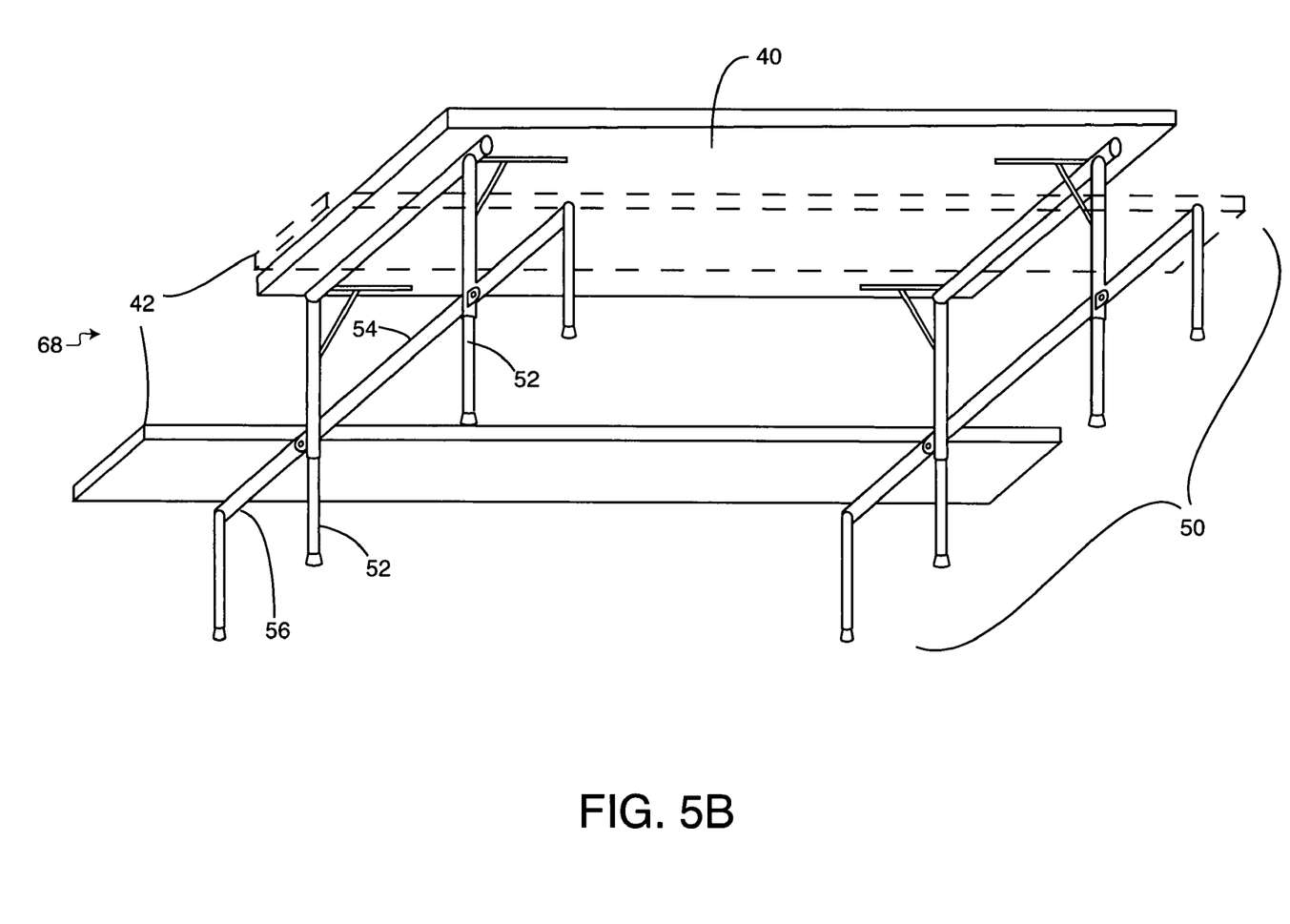
FIG. 5B is a second bottom perspective view of the central elongated member as removed from its recess and deployed as a table.

To form a picnic table 68 (as shown in FIGS. 5A and 5B), the elongated central and side members 40, 42 are removed from the respective recesses 20, 22. The leg members 52 of the central elongated member 40 are moved into the deployed position, i.e., are extended toward the ground to define a picnic table top. The side support members 56 are supportingly connected to the elongated side members 42 to define picnic table bench seats.

Figure 7:
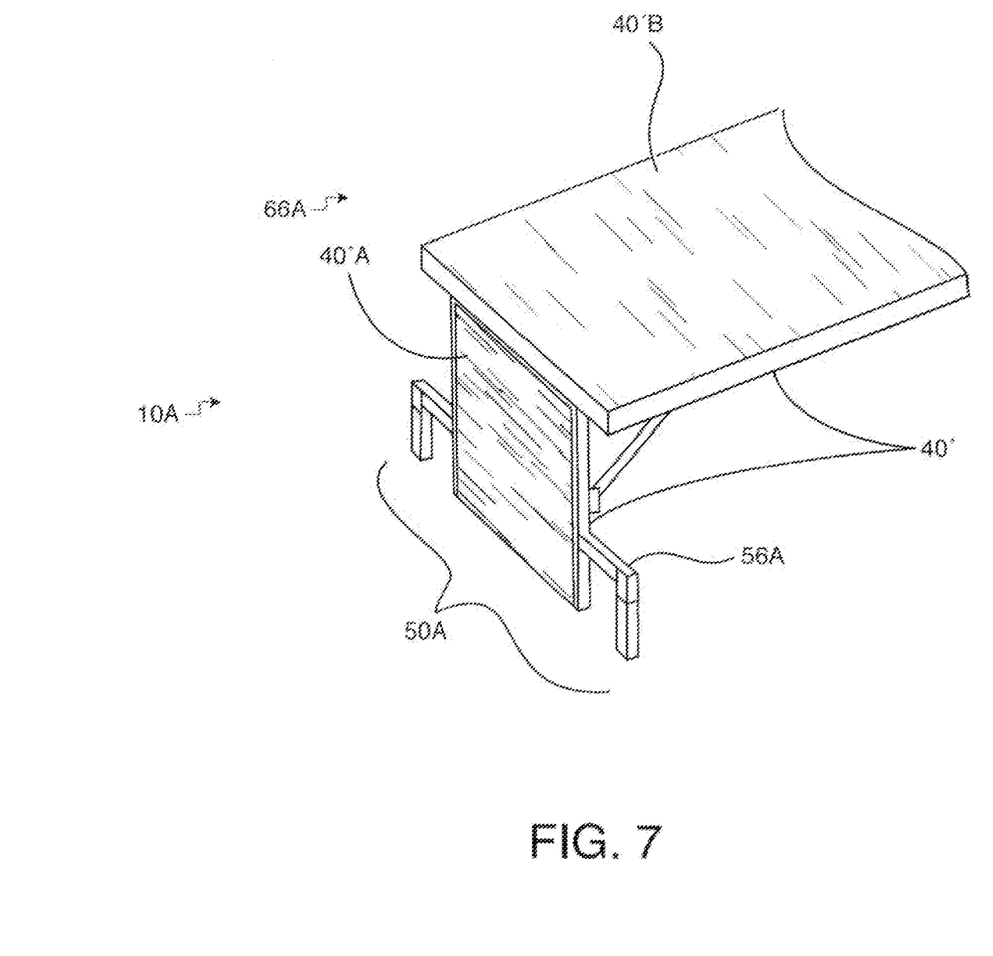
FIG. 7 is a partial perspective view of a second embodiment hinged elongated member of the present invention.
Figure 8A:
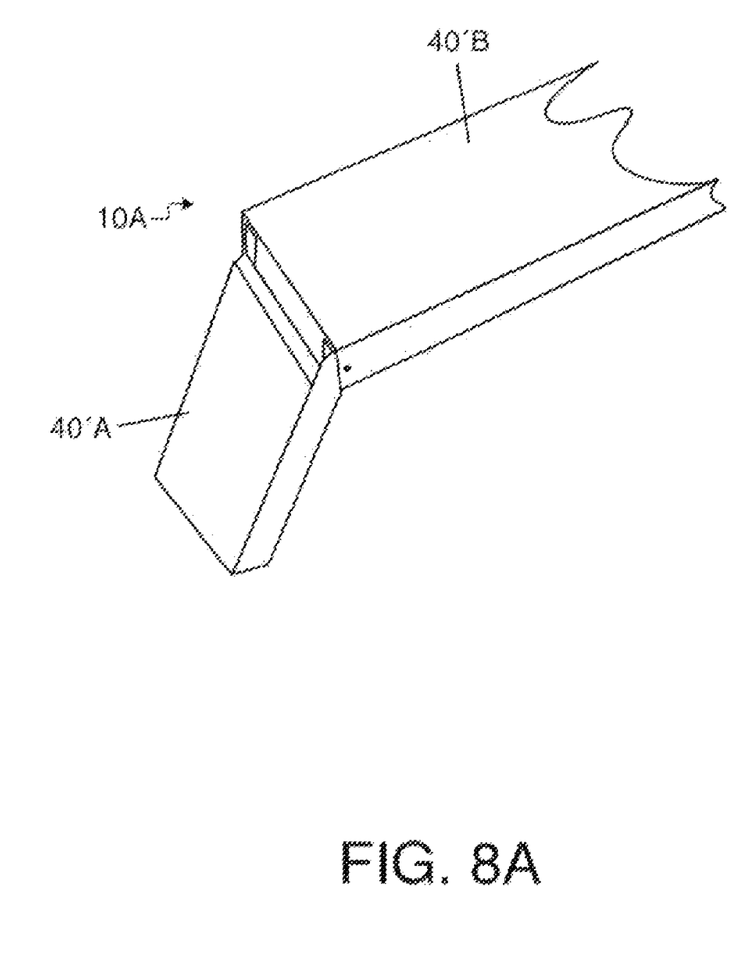
FIG. 8 is a partial perspective view of the embodiment of FIG. 7 with the central elongated member removed from its recess and deployed as a ramp.
Figure 8B:
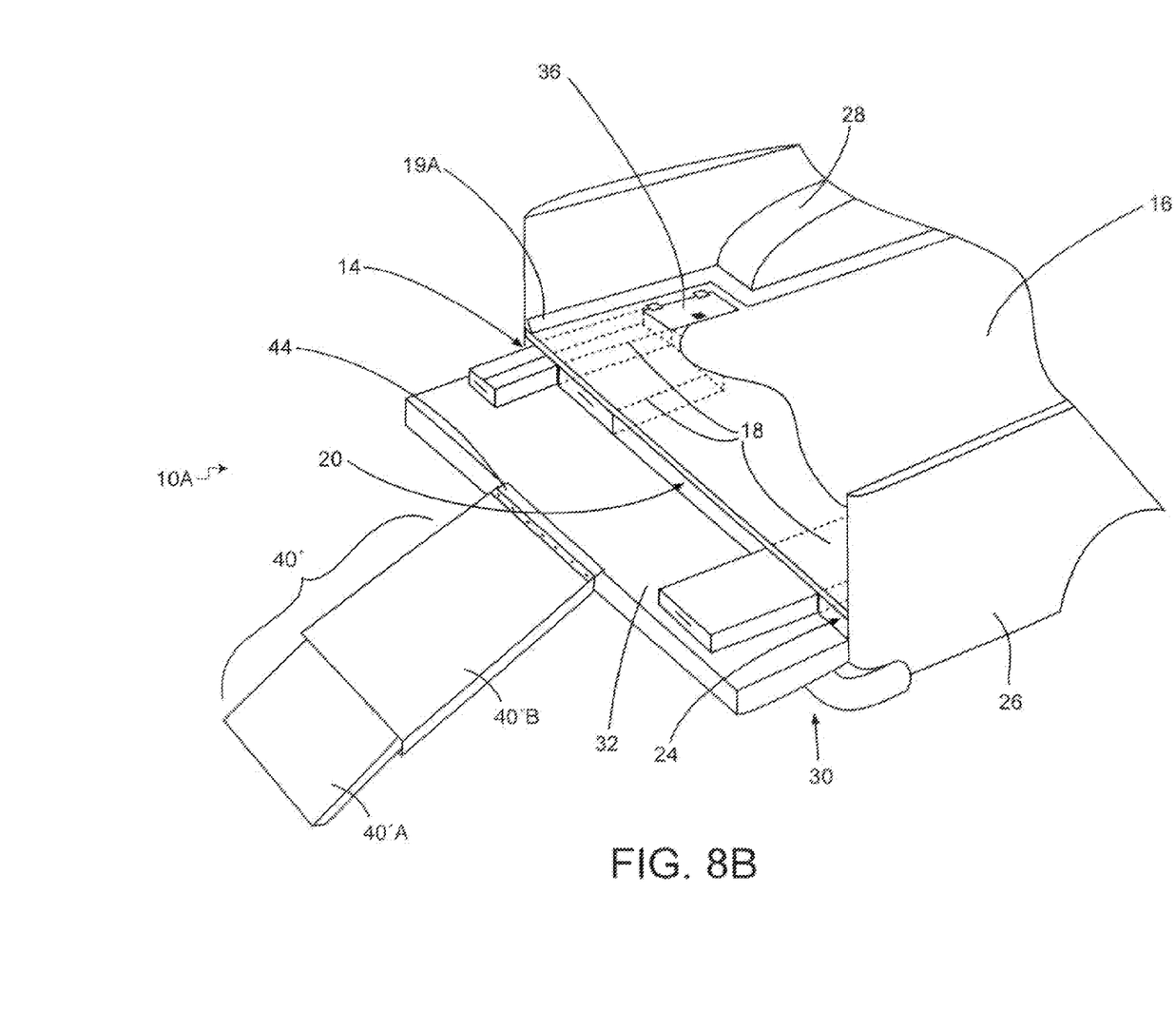
Figure 9:
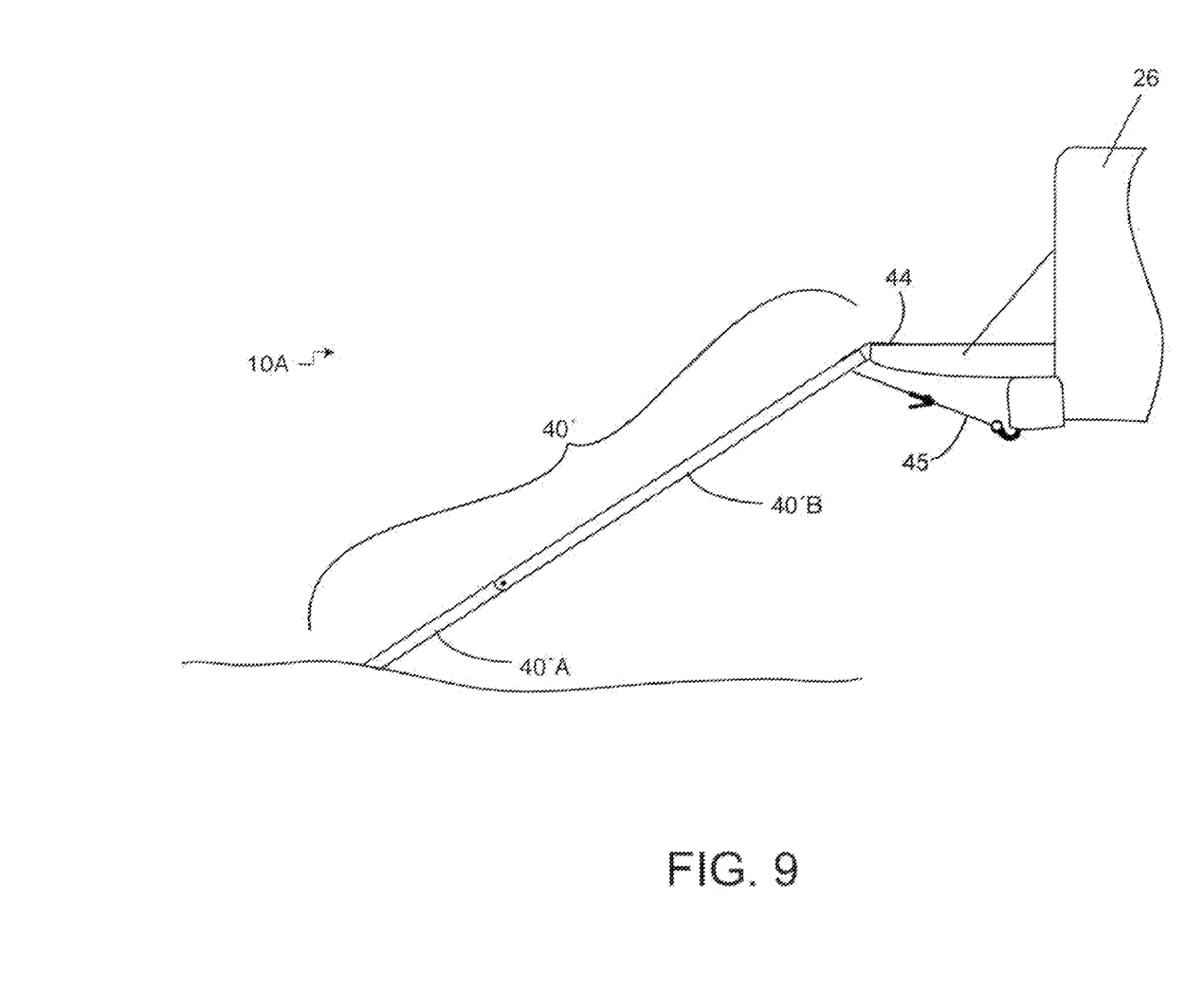
FIG. 9 is a side elevation view of FIG. 8.

One alternate embodiment system 10A of the present invention is illustrated in FIGS. 7-9. This embodiment is substantially as described above regarding FIGS. 1-6, except that for forming worktable 66A, the central elongated member 40' is hinged to define a first portion 40'A and a second portion 40'B. The first portion 40'A may define a leg assembly 50A, with side support members 56A operationally connected thereto. Likewise, each side elongated member 42'is hinged to define a first portion 42'A and a second portion 42'B. Typically, the first portion 40'A, 42'A and 42'A may pivot through a substantially ninety degree arc, with the first and second portions 40' A, 42'A and 40'B, 42'B each respectively defining a substantially planar elongated member 40', 42' at one end of the arc and the first 40'A, 42'A and second 40'B, 42'B portions intersecting at a substantially right angle at the other end of the arc.

Figure 10:
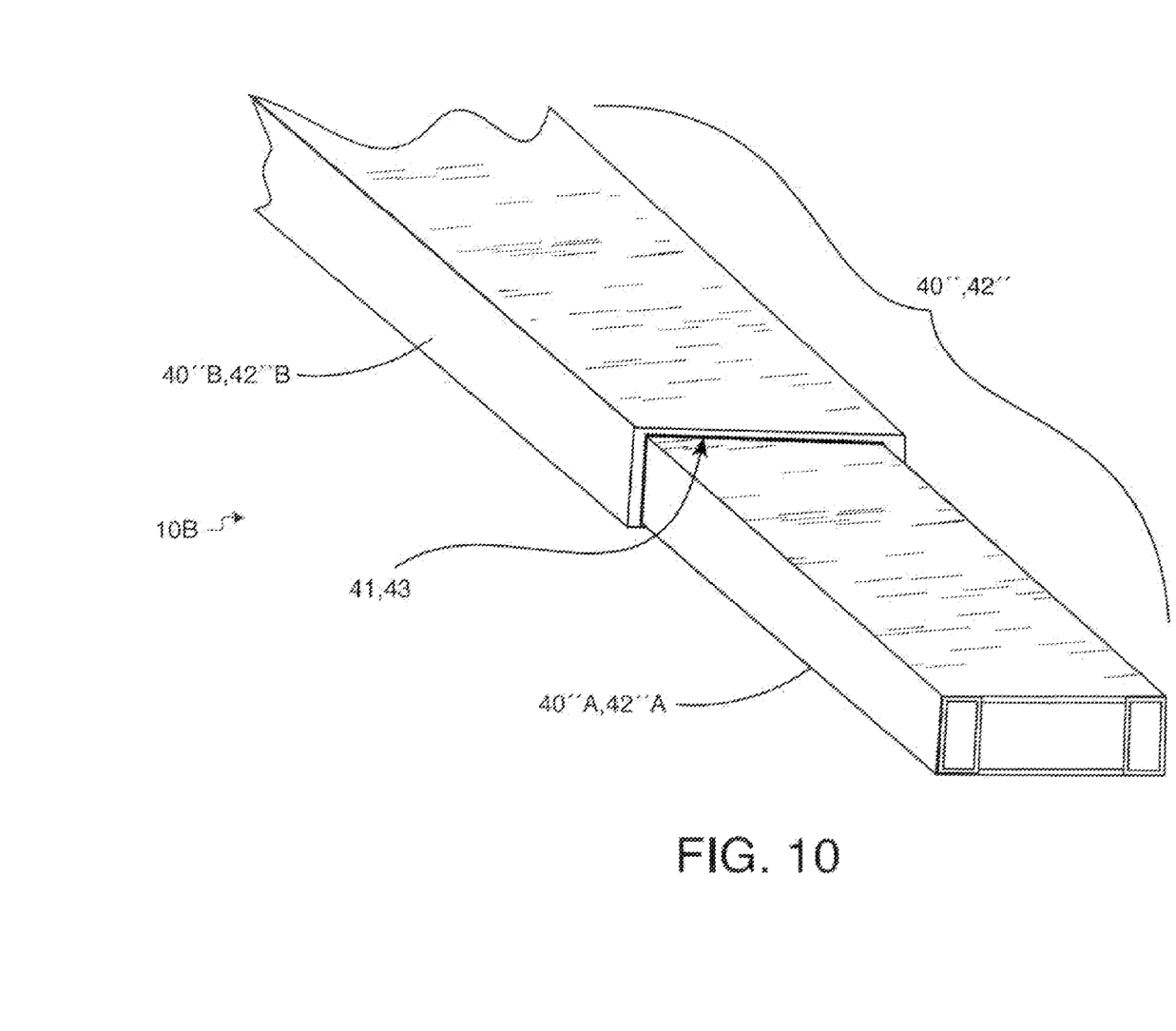
FIG. 10 is a partial perspective view of a third embodiment elongated member of the present invention.

Yet another alternate embodiment system 10B of the present invention is illustrated in FIG. 10. This embodiment is substantially as described above regarding FIGS. 1-6, except that the elongated members 40", 42" are telescoped, with an first hollow portion 40"A, 42"A defining a recess 41, 43 sized to receive second portion 40"B, 42"B. The second portion 40"B, 42"B is typically stored within the respective first portion 40"A, 42"A until needed. In use, the inner portion 40"B, 42"B is almost completely extended from within the respective outer portion 40"A, 42"A, such that the inner and outer portions 40"A-B, 42"A-B remain connected.

While the invention has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A ramp system for a truck bed, comprising:
a substantially flat false truck bed member;
an elongated central recess formed in the substantially flat false truck bed portion;
a first elongated side recess formed in the substantially flat false truck bed portion;
a second elongated side recess formed in the substantially flat false truck bed portion;
an elongated central ramp member removably insertable into the central recess;
first and second elongated side ramp members removably insertable into the respective first and second elongated side recesses;
a central tailgate-engaging hook member connected to the elongated central ramp member;
first and second tailgate-engaging hook members connected to the respective first and second elongated side ramp members;
a plurality of retractable legs pivotably connected to the elongated central ramp member;
connection means for connecting the first and second elongated side ramp members to the plurality of legs; and
a plurality of fasteners operationally connected to the substantially flat false truck bed member;
wherein the plurality of fasteners are engagable to a truck;
wherein the plurality of retractable legs may be pivoted in a first direction into a storage position;
wherein the plurality of retractable legs may be pivoted in a second direction to support the elongated central ramp member as a table; and
wherein when the retractable legs are pivoted in a second direction, the connection means is engagable to connect the first and second side ramp members to the retractable legs to form a picnic table.

2. The ramp system of claim 1 wherein the elongated central recess is positioned between the respective first and second elongated recesses.

3. The ramp system of claim 1 further comprising a flexible member connectable between the elongated central ramp member and the truck, wherein the flexible member is of variable length.

4. The ramp system of claim 1 wherein the plurality of fasteners is a plurality of bolts.

5. The ramp system of claim 1 wherein the plurality of fasteners is a plurality of compression rods.

6. The ramp system of claim 1 further comprising a third elongated side recess formed in the substantially flat false truck bed portion and a drawer sized to be slidably received in the third elongated side recess.

7. The ramp system of claim 1 wherein the elongated central ramp member is hinged.

8. The ramp system of claim 1 wherein the elongated central ramp member is telescoped.

9. The ramp system of claim 1 wherein the respective ramp members are made of aluminum; wherein the elongated central ramp member is about one-eight of an inch thick and about 2 feet wide and about 6 feet long; and wherein the respective elongated side ramp members are about 8 inches wide and about 6 feet long.

* * * * *